and 1 Drawing Sheet

(12) United States Patent
Steelberg et al.

(10) Patent No.: US 7,809,603 B2
(45) Date of Patent: Oct. 5, 2010

(54) ADVERTISING REQUEST AND RULES-BASED CONTENT PROVISION ENGINE, SYSTEM AND METHOD

(75) Inventors: Ryan Steelberg, Irvine, CA (US); Chad Steelberg, Newport Beach, CA (US)

(73) Assignee: Brand Affinity Technologies, Inc., Irvine, CA (US)

( * ) Notice: Subject to any disclaimer, the term of this patent is extended or adjusted under 35 U.S.C. 154(b) by 362 days.

(21) Appl. No.: 11/981,837

(22) Filed: Oct. 31, 2007

(65) Prior Publication Data

US 2009/0070192 A1    Mar. 12, 2009

Related U.S. Application Data

(60) Provisional application No. 60/993,096, filed on Sep. 7, 2007.

(51) Int. Cl.
*G06F 17/00* (2006.01)
(52) U.S. Cl. ..................... 705/10; 705/14.56
(58) Field of Classification Search ............ 705/10, 705/14.56; 505/10, 14.56
See application file for complete search history.

(56) References Cited

U.S. PATENT DOCUMENTS

| 6,141,657 | A  | 10/2000 | Rothberg et al. |
| 6,253,188 | B1 | 6/2001  | Witek et al. |
| 6,338,067 | B1 | 1/2002  | Baker et al. |
| 6,496,803 | B1 | 12/2002 | Seet et al. |
| 6,629,081 | B1 | 9/2003  | Cornelius et al. |
| 6,698,020 | B1 | 2/2004  | Zigmond |
| 6,839,681 | B1 | 1/2005  | Hotz |

(Continued)

FOREIGN PATENT DOCUMENTS

WO    WO2007029881    3/2007

OTHER PUBLICATIONS

Garthwaite, et al.. "The Role of Celebrity Endorsements in Politics: Oprah, Obama. and the 2008 Democratic Primary," Department of Economics, University of Maryland, Sep. 2008. Entire Document; http://econweb.umd.edu/~garthwaite/celebrityendorsements_garthwaitemoore.pdf.

(Continued)

*Primary Examiner*—Thomas Dixon
(74) *Attorney, Agent, or Firm*—Drinker Biddle and Reath LLP

(57) ABSTRACT

A clearinghouse apparatus, system and method for content, including an ad generator, an ad generator interface by which a user can interact with the ad generator, wherein, in an interaction with the ad generator using the ad generator interface, at least one content item other than content owned by the user is requested for inclusion in a creative, a content provision rules engine having a plurality of rules asserted by the owner of the content to govern the inclusion of the content in the creative, including at least one upsell rule, and a content provision interface by which the owner of the content can interact with the content rules engine to assert the plurality of rules. The invention may additionally include an approval engine, wherein ones of the plurality of rules necessitate that the creative be reviewed and approved by the owner prior to the inclusion of the content, and an approval engine interface by which the owner can interact with the approval engine.

18 Claims, 1 Drawing Sheet

U.S. PATENT DOCUMENTS

| | | |
|---|---|---|
| 6,907,581 B2 | 6/2005 | Noy |
| 6,954,728 B1 | 10/2005 | Kusumoto et al. |
| 7,003,420 B2 | 2/2006 | Ur et al. |
| 7,058,624 B2 | 6/2006 | Masters |
| 7,200,565 B2 | 4/2007 | Basson et al. |
| 7,584,118 B1 | 9/2009 | Bellare et al. |
| 2001/0037205 A1 | 11/2001 | Joao |
| 2002/0002488 A1 | 1/2002 | Muyres et al. |
| 2002/0042738 A1 | 4/2002 | Srinivasan et al. |
| 2002/0056120 A1 | 5/2002 | McTernan et al. |
| 2002/0073084 A1 | 6/2002 | Kauffman et al. |
| 2002/0103698 A1 | 8/2002 | Cantrell |
| 2002/0123994 A1 | 9/2002 | Schabes et al. |
| 2002/0141584 A1* | 10/2002 | Razdan et al. .............. 380/203 |
| 2002/0178447 A1 | 11/2002 | Plotnick et al. |
| 2002/0194070 A1 | 12/2002 | Totham et al. |
| 2003/0023598 A1 | 1/2003 | Janakiraman et al. |
| 2003/0078828 A1 | 4/2003 | Basson et al. |
| 2003/0229507 A1 | 12/2003 | Perge |
| 2004/0030741 A1 | 2/2004 | Wolton et al. |
| 2004/0059996 A1 | 3/2004 | Fasciano |
| 2004/0122735 A1 | 6/2004 | Meshkin |
| 2004/0143600 A1 | 7/2004 | Musgrove et al. |
| 2004/0186776 A1 | 9/2004 | Llach |
| 2004/0216157 A1 | 10/2004 | Shain et al. |
| 2004/0225647 A1 | 11/2004 | Connelly et al. |
| 2004/0249700 A1 | 12/2004 | Gross |
| 2005/0010475 A1 | 1/2005 | Perkowski et al. |
| 2005/0137939 A1 | 6/2005 | Calabria et al. |
| 2005/0209909 A1 | 9/2005 | Dull et al. |
| 2005/0234998 A1 | 10/2005 | Lesandrini et al. |
| 2006/0004691 A1 | 1/2006 | Sifry |
| 2006/0026067 A1 | 2/2006 | Nicholas et al. |
| 2006/0041562 A1 | 2/2006 | Paczkowski et al. |
| 2006/0069663 A1 | 3/2006 | Adar et al. |
| 2006/0094506 A1 | 5/2006 | Tarter et al. |
| 2006/0111967 A1 | 5/2006 | Forbes |
| 2006/0123053 A1 | 6/2006 | Scannell, Jr. |
| 2006/0129446 A1 | 6/2006 | Ruhl et al. |
| 2006/0143158 A1 | 6/2006 | Ruhl et al. |
| 2006/0167784 A1 | 7/2006 | Hoffberg |
| 2006/0178918 A1 | 8/2006 | Mikurak |
| 2006/0195863 A1 | 8/2006 | Whymark |
| 2006/0212350 A1 | 9/2006 | Ellis |
| 2006/0218141 A1 | 9/2006 | Tuttle et al. |
| 2006/0224452 A1 | 10/2006 | Ng |
| 2006/0230011 A1 | 10/2006 | Tuttle et al. |
| 2006/0277105 A1 | 12/2006 | Harris |
| 2006/0287916 A1 | 12/2006 | Starr et al. |
| 2007/0005424 A1 | 1/2007 | Arauz |
| 2007/0027743 A1 | 2/2007 | Carson |
| 2007/0053513 A1 | 3/2007 | Hoffberg |
| 2007/0061199 A1 | 3/2007 | Montgomery et al. |
| 2007/0067297 A1 | 3/2007 | Kublickis |
| 2007/0074258 A1 | 3/2007 | Wood |
| 2007/0089129 A1 | 4/2007 | Verhaegh |
| 2007/0100688 A1 | 5/2007 | Book |
| 2007/0112630 A1 | 5/2007 | Lau et al. |
| 2007/0143186 A1 | 6/2007 | Apple et al. |
| 2007/0143345 A1 | 6/2007 | Jones et al. |
| 2007/0156677 A1 | 7/2007 | Szabo |
| 2007/0157228 A1 | 7/2007 | Bayer et al. |
| 2007/0162335 A1 | 7/2007 | Mekikian |
| 2007/0162926 A1 | 7/2007 | Steelberg et al. |
| 2007/0192129 A1 | 8/2007 | Fortuna |
| 2007/0198344 A1* | 8/2007 | Collison et al. .............. 705/14 |
| 2007/0219940 A1 | 9/2007 | Mueller et al. |
| 2007/0239530 A1 | 10/2007 | Datar et al. |
| 2007/0239535 A1 | 10/2007 | Koran et al. |
| 2007/0250901 A1 | 10/2007 | McIntire et al. |
| 2007/0260520 A1 | 11/2007 | Jha et al. |
| 2007/0266326 A1 | 11/2007 | Evans et al. |
| 2007/0282684 A1 | 12/2007 | Prosser et al. |
| 2007/0288309 A1 | 12/2007 | Haberman et al. |
| 2007/0288431 A1 | 12/2007 | Reitter et al. |
| 2008/0004947 A1 | 1/2008 | Mathew et al. |
| 2008/0033587 A1 | 2/2008 | Kurita et al. |
| 2008/0033736 A1 | 2/2008 | Bulman |
| 2008/0033776 A1 | 2/2008 | Marchese |
| 2008/0033790 A1 | 2/2008 | Nickerson et al. |
| 2008/0033806 A1 | 2/2008 | Howe et al. |
| 2008/0034314 A1 | 2/2008 | Louch et al. |
| 2008/0040175 A1 | 2/2008 | Dellovo |
| 2008/0052541 A1* | 2/2008 | Ginter et al. ................ 713/194 |
| 2008/0059208 A1 | 3/2008 | Rockfeller et al. |
| 2008/0059286 A1 | 3/2008 | Nickerson et al. |
| 2008/0065491 A1 | 3/2008 | Bakman |
| 2008/0077574 A1 | 3/2008 | Gross |
| 2008/0086368 A1 | 4/2008 | Bauman |
| 2008/0086432 A1 | 4/2008 | Schmidtler et al. |
| 2008/0090551 A1 | 4/2008 | Gidron et al. |
| 2008/0091516 A1 | 4/2008 | Giunta |
| 2008/0103886 A1 | 5/2008 | Li et al. |
| 2008/0109285 A1 | 5/2008 | Reuther et al. |
| 2008/0120325 A1 | 5/2008 | Davis |
| 2008/0126178 A1 | 5/2008 | Moore |
| 2008/0126476 A1 | 5/2008 | Nicholas et al. |
| 2008/0140502 A1 | 6/2008 | Birnholz et al. |
| 2008/0154625 A1 | 6/2008 | Serbanescu |
| 2008/0155650 A1* | 6/2008 | Dutta et al. .................... 726/1 |
| 2008/0162281 A1 | 7/2008 | Davis et al. |
| 2008/0167957 A1 | 7/2008 | Steelberg et al. |
| 2008/0168135 A1 | 7/2008 | Redlich et al. |
| 2008/0172293 A1 | 7/2008 | Raskin et al. |
| 2008/0183806 A1 | 7/2008 | Cancel |
| 2008/0209001 A1 | 8/2008 | Boyle et al. |
| 2008/0215474 A1 | 9/2008 | Graham |
| 2008/0243767 A1 | 10/2008 | Naibo et al. |
| 2008/0249855 A1 | 10/2008 | Collins et al. |
| 2008/0255936 A1 | 10/2008 | Ghate |

OTHER PUBLICATIONS

Tong, X., Creation of Brand Equity in the Chinese Clothing Market. Dissertation, Graduate School University of Missouri-Columbia. Dec. 2006; http://edt.missouri.edu/Fall2006/Dissertation/TongX-120806-D6156/research.pdf.

* cited by examiner

ADVERTISING REQUEST AND RULES-BASED CONTENT PROVISION ENGINE, SYSTEM AND METHOD

CROSS-REFERENCE TO RELATED APPLICATIONS

This application claims the benefit of U.S. Provisional Application Ser. No. 60/993,096, filed Sep. 7, 2007, the entire disclosure of which are incorporated by reference herein as if set forth in its entirety.

The present application is related to concurrently filed U.S. patent application Ser. No. 11,981,646, entitled "ENGINE SYSTEM AND METHOD FOR GENERATION OF A BRAND AFFINITY CONTENT" filed Oct. 31, 2007, the entire contents of which are incorporated herein by reference.

BACKGROUND OF THE INVENTION

1. Field of the Invention

The present invention is directed to an advertising engine and, more particularly, to an advertising request and rules-based content provision engine, and a method of making and using same.

2. Description of the Background

In the current art, a true marketplace for endorsed advertising is not available. This is due, in part, to the lack of a convenient clearinghouse that might allow for application of rules preferred by prospective endorsers before such prospective endorsers would allow use of an endorsement.

Thus, there exists a need for an apparatus, system and method that would provide a convenient clearinghouse for application of rules preferred by prospective endorsers before such prospective endorsers would allow use of an endorsement.

SUMMARY OF THE INVENTION

The present invention includes at least an automated computerized clearinghouse apparatus, system and method for content, including an ad generator, an ad generator interface by which a user can interact with the ad generator, wherein, in an interaction with the ad generator using the ad generator interface, at least one content item other than content owned by the user is requested for inclusion in a creative, a content provision rules engine having a plurality of rules asserted by the owner of the content to govern the inclusion of the content in the creative, including at least one upsell rule, and a content provision interface by which the owner of the content can interact with the content rules engine to assert the plurality of rules. The invention may additionally include an approval engine, wherein ones of the plurality of rules necessitate that the creative be reviewed and approved by the owner prior to the inclusion of the content, and an approval engine interface by which the owner can interact with the approval engine.

Thus, the present invention provides an apparatus, system and method that would provide a convenient clearinghouse for application of rules preferred by prospective endorsers before such prospective endorsers would allow use of an endorsement.

BRIEF DESCRIPTION OF THE FIGURES

The present invention will be described hereinbelow in conjunction with the following figures, in which like numerals represent like items, and wherein.

DETAILED DESCRIPTION OF THE INVENTION

Figure 1:
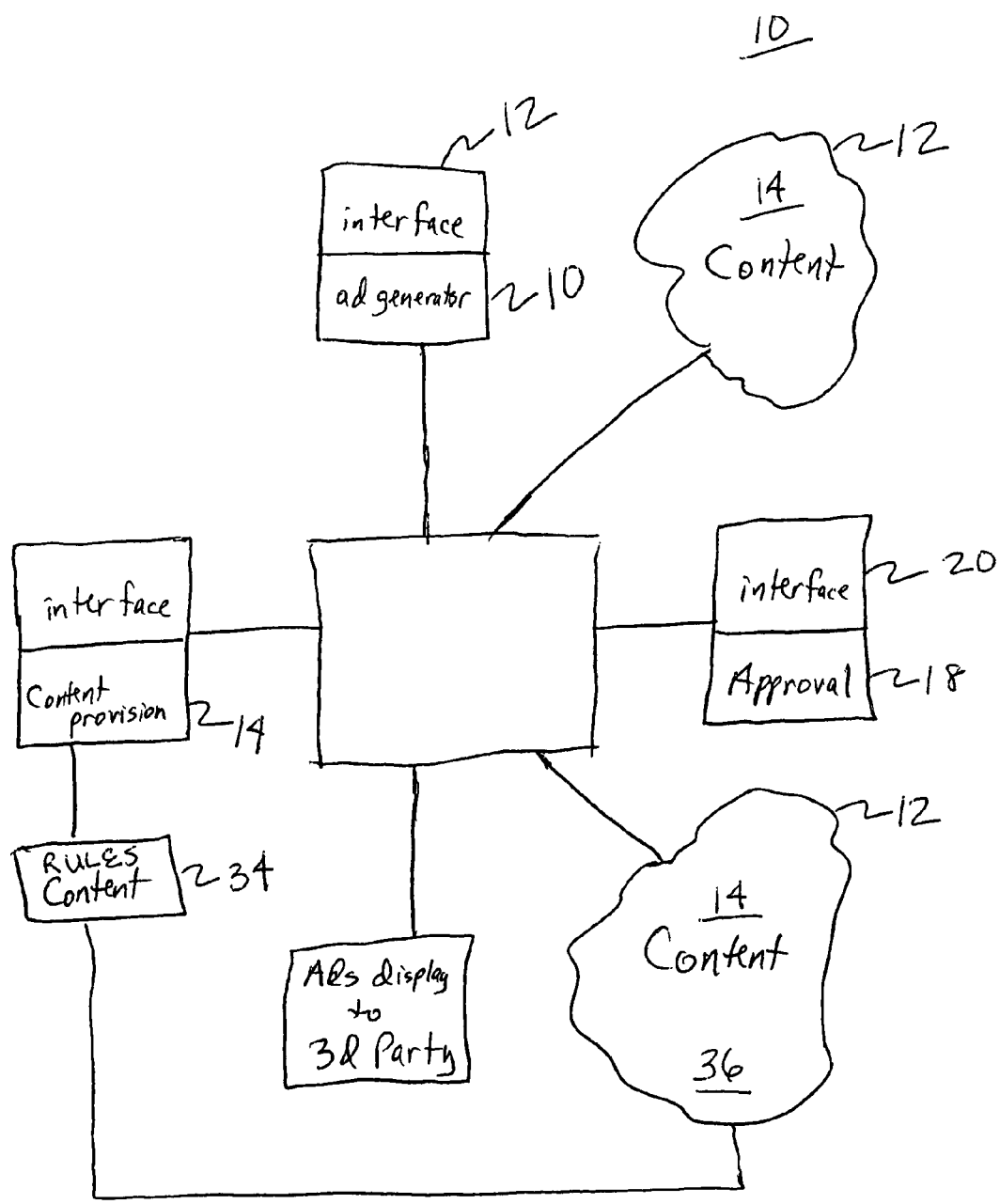
FIG. 1 is illustrative of the present invention.

It is to be understood that the figures and descriptions of the present invention have been simplified to illustrate elements that are relevant for a clear understanding of the present invention, while eliminating, for the purposes of clarity, many other elements found in typical advertising engines, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention is and includes a clearinghouse that allows for the use of approved, copyrightable, and/or public persona content by non-owners of such content, such as pre-approved photographs, audio, video files, data files, printed text, logos and trademarks, publicity announcements, metatags and metatag streams, and the like. The present invention provides for the use of brand recognition to create brand affinity, at least in that the present invention allows for the use of known and relevant brands in association with endorsed or advertised brands, which endorsement or advertisement is requested by an advertisement requester.

FIG. 1 is illustrative of the present invention. As shown in FIG. 1, the present invention includes at least an advertisement/endorsement generator (hereinafter ad generator) 10, an ad generator interface 12, a content provision rules engine 14, a content provision interface 16, an approval engine 18, and an approval engine interface 20.

In this exemplary embodiment, the ad generator may provide, via the ad generator interface, the capability for a user (also referred to as the ad requester) to create an advertisement, announcement, data file, or the like, with or without an association with an endorser, affiliate, affiliated product, or the like, such as using external content or content from one or more vaults associated with the content provision rules engine discussed further below. The ad generator may provide, for example, a multiplicity of advertisement templates, from among which a user may select a desired advertisement format. Such format may include, for example, a requested endorsement or affiliation. Such endorsement or affiliation may be recommended to the user, such as by endorser or affiliation type, or specific endorsers or affiliates, which specific endorsers or affiliates may be exemplary, a totality of specifics, or menu based or categorically driven. Such suggested endorsers or affiliates may be presented to the user in order to minimize the cost of use of that endorsement or affiliation to the ad requester, in order to maximize the cost of use for that endorsement or affiliation, based on a cost of use range selected by a user, or other similar presentation methodologies, certain of which may be entered by the content provider to the content provision rules engine as discussed below. Through the use of the ad generator via an easy to use ad generator interface, the user may simplistically generate an advertisement or announcement for endorsement or affiliation.

The content provision rules 34 may be accessible to a content-providing user (also referred to as the "owner" of the content, although the providing user may not own the content, but must have a right to control the content) via the content provision interface communicating with the content provision rules engine. The content provision rules engine may allow for the selection by a content provision user of what usages and approvals for usage will be allowable for the content made available by the content provision user. The content 36 provided by the content provision user may be entered directly for storage in the vault(s) through the content provision interface by the content provision user, or may be provided via a link to the content, which link is external to the content provision rules engine and interface, but which link may allow the content rules engine to draw the content from any source in any format. As such, the content provision rules engine may include a normalization engine whereby content may be discerned in any format, or any human or computer language, from any source and normalized to the preferred format employed by the content provision rules engine. As discussed above, the provided content may be audiovisual content, metatag or metatag stream content, or the like.

The usages allowable for the content provided by the content provision user, as per the rules selected or entered, may include usage with regard to particular products, causes, announcements, particular geographies, or the like. Further, such usages may be provided with a cost per use, a cost per bundle of uses, or a cost for permanent usability, for example. The allowable permissions may provide automatic approval for usages entered as being within pre-approved categories, or may provide that certain or all usage requests be forwarded back to the content provision user via the approval engine and approval engine interface for approval. Further, the content provision user may enter that its endorsement or affiliation be available only as a premier use, such as in cases where the rules engine endeavors to upsell an ad requester from a requested level of cost of content to more expensive content. Such premier usages may allow a content provision user to maintain the goodwill and good name of premium brands. As such, the rules engine may include allowances as to which parties using the ad generator should even be offered the content provided for use in endorsements or affiliations.

For example, the content provider may allow for affiliations, endorsements or sponsorships from certain specific entities or certain types of entities, and such affiliations, sponsorships or endorsements may be presented to the ad requester, and may be used, for example, for an additional fee. Such an "upsell" rule 34 may be particularly useful in the event the ad requester has entered only the brand of the ad requester, and not requested additional third party content. In such a case, research, such as third party research, may be imported by the content provision engine to assess whether the ad requested could be improved by an "upsell", which may be an endorser, affiliate, partner or sponsor available (based on the content provision rules) for the type of ad requested. Such upsell decisions may be based on geography, product type, recognition of the brand in the ad requested, and similar factors. For example, and ad requested for television in Los Angeles for "Super Soap" may be improved if the ad requester is offered an affiliation with Bath and Body Works, and may be further improved (in part due to the geography of the ad in Los Angeles) by an endorsement of the Bath and Body Works affiliation by a famous Los Angeles actress. Likewise, an after-shave commercial may work well as an advertisement during a football game, but after-shave in conjunction with a fantasy sports site sponsor may work even better for the success of the ad.

Thereby, the upsell can be offered to further improve the effectiveness of the ad requested, based on content available via the content provision rules, and/or research that may, or may not, be presented to help convince the ad requester of the propriety of selecting the upsell. For example, such research may include brand recognitions, recognition comparisons, available affiliates, sponsors, endorsers or partners that historically improve brand recognition in particular areas (and that are authorized to be in such an upsell by the content provisions rules).

The example above is by no means limiting with respect to an upsell. Myriad other research may be incorporated for an upsell, as will be apparent to those skilled in the art in view of the disclosure herein. For example, inferences about customers of certain products may be made based on the time of day an audio/visual work to be associated with the requested ad is generally accessed by viewers, sites from which viewers access such content, geographical location of frequent viewers, and the like, and such inferences may be used to upsell an ad requester to ads in a certain geography, at a certain time, or in a certain media outlet. As such, the content provision rules, and the upsells and research associated therewith, may have access to, or be accessible from, advertising and research engines in any media outlet accessible from any communication point in the present invention. Such communication points may, of course, include networked environments, wireless network environments, television, cabled and satellite environments, personal electronic device environments, and the like. Further, the access to the present invention of such external advertising engines may allow for the publishing of new applications, in accordance with the content provisions rules, to the present invention by third party application creators.

The rules engine may allow for provision of the requested content with affiliation, sponsorship, or endorsement in the event that external research has proven that it will not hurt the person or brand that was requested by the ad requester, or in the event that such affiliation, sponsorship or endorsement will help the standing or recognition of the brand or person that was requested by the ad requester.

The approval engine provided to a content provision user via the approval interface may allow for advertisements requested by users of the ad generator to be forwarded back to the content provider for a variety of reasons, including final approval, tracking, and reporting. For example, certain advertisements or endorsements may be automatically approved based on an adherence to the rules entered into the content provision rules engine. However, even such automatically approved endorsements or affiliations may be tracked by, or reported in a requested format to, the content provider. Additionally and alternatively, requested endorsements or affiliations meeting certain criteria may be forwarded back to the content provider, or all requests may be forwarded back to the content provider, for final approval.

The present invention allows for the avoidance of brand dilution, such as by allowing approvals of limited usage, such as in limited geographic areas, of certain endorsements or affiliations. For example, a Philadelphia athlete may feel that his or her likeness is overused in the Philadelphia area, but may be more than willing to expand that athlete's brand into California for use as an endorser of Philadelphia-themed restaurants in California who wish to use his or her likeness. Further, certain very well respected entities, such as the American Cancer Society, may wish to expand the awareness or influence of their particular causes, but may wish to do so only by affiliation with publicly acceptable causes that support their causes, or with non-profit causes, or the like. Such allowable uses, or exclusions, may be entered as content provision rules.

As such, the present invention may provide for a clearinghouse for any and all copyrightable, trademarked, and or public persona content.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

What is claimed is:

1. A clearinghouse for content, comprising:
an ad generator comprising a plurality of templates, and adapted for generating a creative based on at least one of said plurality of templates from at least one processor;
an ad generator interface adapted to enable a user to interact with said ad generator, wherein, in an interaction with said ad generator using said ad generator interface, at least one endorsement is requested by the user for inclusion in the creative;
a content provision rules engine adapted for using the at least one processor to execute at least one of a plurality of computer programmable rules, the executed at least one of the rules being asserted by an endorser of the endorsement to govern the inclusion of the endorsement in the creative; a content provision interface adapted to enable the endorser to interact with said content rules engine to assert the plurality of rules;
an approval engine provided by the at least one processor and adapted to facilitate reviewing and approving inclusion of the endorsement in the creative by the endorser, in accordance with ones of the plurality of rules; and
an approval engine interface provided at least partially by the at least one processor and adapted to enable the endorser to interact with said approval engine.

2. The clearinghouse of claim 1, wherein the endorsement comprises at least one of copyrighted, trademarked, and public persona content.

3. The clearinghouse of claim 1, wherein the endorsement comprises at least one of photographs, audio, video files, data files, printed text, logos and trademarks, publicity announcements, metatags and metatag streams.

4. The clearinghouse of claim 1, wherein the creative comprises an advertisement.

5. The clearinghouse of claim 1, wherein the endorsement is recommended to the user based on the rules.

6. The clearinghouse of claim 1, wherein the rules comprise a normalization engine.

7. The clearinghouse of claim 1, wherein the rules govern pricing of the endorsement based on at least one of particular products, particular product categories, causes, announcements, and geographies.

8. The clearinghouse of claim 1, wherein the rules govern pricing of the endorsement based on at least one of a cost per use, a cost per bundle of uses, and a cost for permanent usability.

9. A clearinghouse for content, comprising:
an ad generator interface instantiated by at least one processor, by which a user requests at least one content item for inclusion in a requested creative;
a content provision rules engine instantiated by the processor to execute at least one of a plurality of computer programmable content provision rules, the executed at least one rule being asserted by an owner of the content to govern the inclusion of the content item in the creative;
a content provision interface by which the owner of the content, interacting with the processor and independent of the user and responsive to the request, interacts with the content provision rules engine to assert the executed at least one rule; and
an approval engine executed by the processor to approve the inclusion of the content in the creative in accordance with the executed at least one rule and with at least one input to said content provision interface.

10. The clearinghouse of claim 9, wherein said plurality of rules comprises at least one upsell rule.

11. The clearinghouse of claim 9, further comprising a reporting engine adapted for reporting a success of the creative with the inclusion of the content.

12. The clearinghouse of claim 10, wherein the upsell rules increase an effectiveness of the creative to more than the effectiveness of the initially requested content.

13. The clearinghouse of claim 12, wherein the creative comprises an advertisement, and wherein the effectiveness comprises customer response.

14. The clearinghouse of claim 11, wherein the success comprises a consumer response.

15. The clearinghouse of claim 11, wherein said reporting engine further comprises a comparator adapted for comparing the success with and without the inclusion.

16. The clearinghouse of claim 9, wherein the creative comprises an advertisement.

17. The clearinghouse of claim 9, wherein the at least one content item comprises an endorsement.

18. The clearinghouse of claim 9, wherein the at least one content item comprises at least one of copyrighted and trademarked content.

* * * * *